J. G. KLUGE.
Bake Oven.

No. 95,811. Patented Oct. 12, 1869.

Witnesses.
C Wahlers
E. F. Kastenhuber

Inventor.
Julius G. Kluge
p.
Van Santvoord & Hauff
Atty.

United States Patent Office.

JULIUS GUSTAV KLUGE, OF NEW YORK, N. Y.

Letters Patent No. 95,811, dated October 12, 1869.

BAKERS' OVEN.

The Schedule referred to in these Letters Patent and making part of the same.

*To all whom it may concern:*

Be it known that I, JULIUS GUSTAV KLUGE, of the city, county, and State of New York, have invented a new and useful Improvement in Bakers' Oven; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
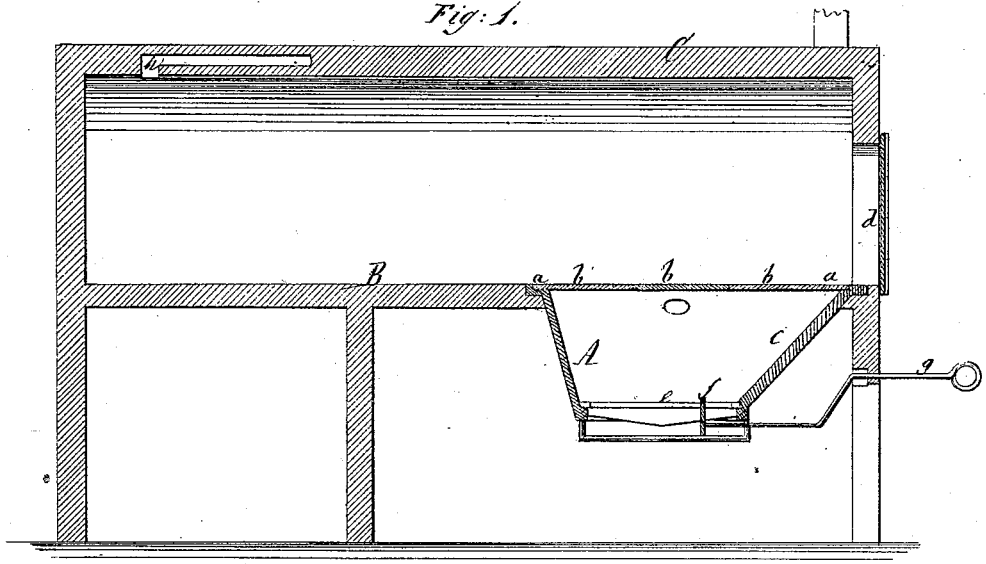
Figure 1 represents a longitudinal vertical section of this invention.
Figure 2:
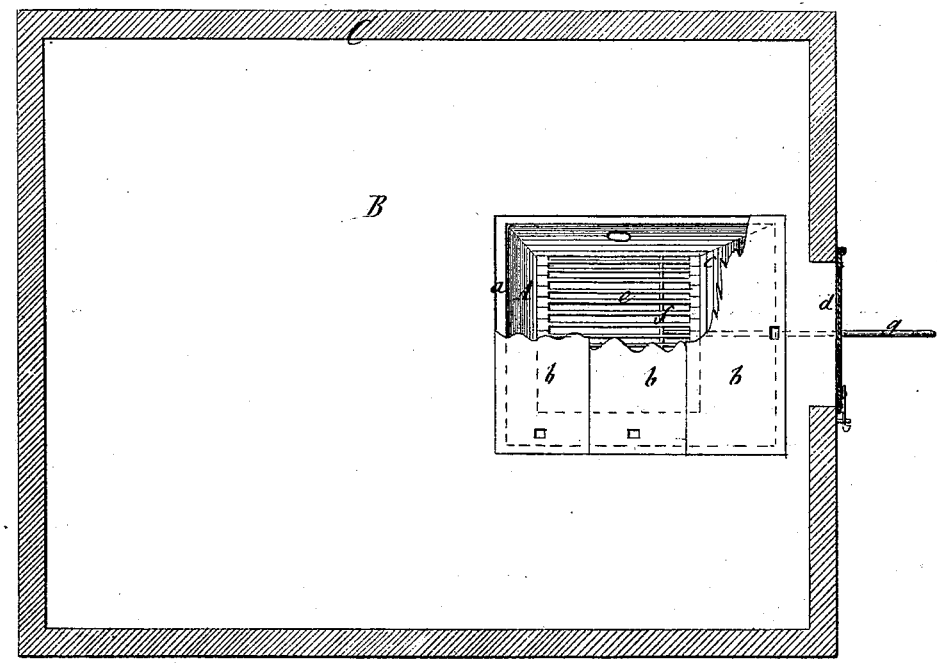
Figure 2 is a horizontal section of the same.

This invention consists in the arrangement of a fire-pot, set into a cavity or aperture in the hearth of a baker's oven, and provided with a flanged rim to receive covering-plates, and with an inclined front to give convenient access to the fire, in such a manner that when the interior of the oven has been sufficiently heated, the fire-pot can be covered up and the entire area of the hearth is available for baking-purposes, without the necessity of cleaning out the fire and without danger of bringing the articles to be baked in contact with coals or ashes, and at the same time convenient access can be had to the fire whenever it may be requisite.

In the drawing—

The letter A designates a fire-pot, which is made of cast-iron, or any other material, and provided with a flanged rim, $a$, to receive and retain a series of flat covering-plates, $b$.

This fire-pot is set into a cavity in the hearth B of a baker's oven, C, so that when the covering-plates $b$ are put on, the hearth will present an unbroken surface.

The front side $c$ of the fire-pot is inclined outward, so that when said pot is in position, and the door $d$ of the oven is opened, easy access can be had to the fire.

The bottom of the fire-pot is opened and made to receive a grate, $e$, and through between the bars of this grate extend the fingers of a rake, $f$, to which a reciprocating motion can be imparted by means of a handle, $g$, so that the fire can be easily kept clean.

The covering-plates $b$ will, in practice, be made of cast-iron, and provided with holes to receive the tip of a lifter, so that said plates can be readily taken out and replaced without burning the fingers.

In the roof of the oven are flues $h$, which lead to the chimney.

By this arrangement of the fire-pot the oven can be heated without soiling the hearth, and after the required temperature has been attained, the fire-pot can be covered up and the entire area of the hearth is available for baking-purposes.

The articles to be baked are not liable to come in contact with coals or ashes, the fire in the fire-pot can be readily attended to, and the operation of the oven is materially simplified.

If the fire-pot is covered up, the vapors arising from the fire are carried off by a pipe in the side of the pot, and conducted to the chimney. When the fire-pot is open, said pipe is closed by a suitable damper.

What I claim as new, and desire to secure by Letters Patent, is—

The fire-pot A, provided with a flanged rim to receive the covering-plates $b$, and with an outwardly-inclined side, $c$, to give ready access to the fire, in combination with the hearth of a baker's oven, all constructed and arranged substantially in the manner shown and described.

Witnesses:     JULIUS GUSTAV KLUGE.
W. HAUFF,
E. F. KASTENHUBER.